Oct. 13, 1964     J. WOLFF     3,152,661

ELECTRO-ACOUSTIC APPARATUS

Filed July 9, 1962     2 Sheets-Sheet 1

INVENTOR
JOACHIM WOLFF

BY

ATTORNEY

Oct. 13, 1964    J. WOLFF    3,152,661
ELECTRO-ACOUSTIC APPARATUS
Filed July 9, 1962    2 Sheets-Sheet 2

INVENTOR
JOACHIM WOLFF
BY
ATTORNEY

United States Patent Office 3,152,661
Patented Oct. 13, 1964

3,152,661
ELECTRO-ACOUSTIC APPARATUS
Joachim Wolff, London, England, assignor to
Cosmocord Limited
Filed July 9, 1962, Ser. No. 208,283
Claims priority, application Great Britain July 19, 1961
4 Claims. (Cl. 181—32)

This invention relates to electroacoustic apparatus, and is primarily concerned with diaphragms suitable for use in such apparatus.

The design of diaphragms for electroacoustic apparatus has been the subject of much research. It is well known that a design of a diaphragm must be a compromise between the conflicting requirements of lightness and rigidity. It is required that a diaphragm should have a low mass in order that its inertia should be low; on the other hand, it is required that the diaphragm should be as stiff as possible in order that it may move with a piston-like movement. Should the diaphragm not move in this way, but break up into a series of vibrational patterns, energy will be lost frictionally in the diaphragm and the efficiency of the device in which it is incorporated will be impaired.

The present invention has for its object to provide an improved form of diaphragm and in accordance with the invention there is provided a diaphragm for an electroacoustic apparatus, said diaphragm being made of a sheet material containing aluminium, said aluminium being non-uniformly anodised, thereby to provide areas of the diaphragm of different stiffness or elasticity.

The invention also includes a method of forming a diaphragm for an electroacoustic apparatus, which comprises first shaping a substantially planar thin sheet of material including aluminum to a non-planar form and thereafter locally anodising said sheet to increase its stiffness.

Other features and advantages of the invention will appear from the following description of embodiments thereof, given by way of example only, in conjunction with the accompanying drawings, in which.

Figure 1:
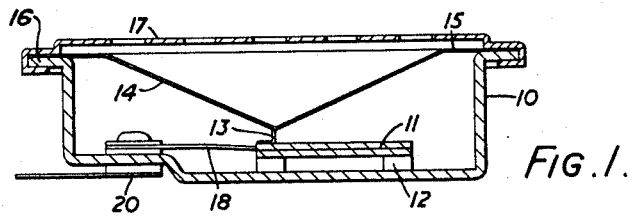
FIGURE 1 is a cross sectional view of an example of a microphone construction, with which a diaphragm in accordance with the invention can be used with advantage.
Figure 2A:
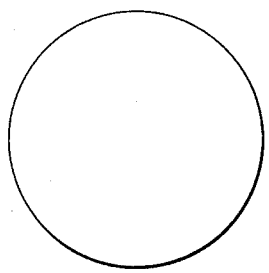
FIGURES 2a to 2e are plan views of alternative forms of diaphragm.
Figure 2B:
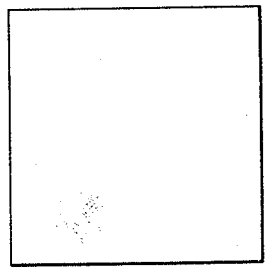
Figure 2C:
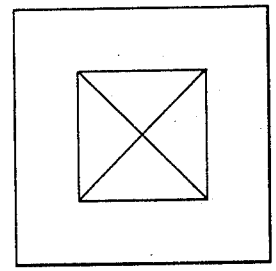
Figure 2D:
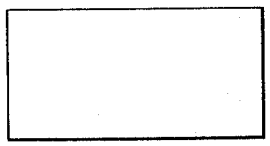
Figure 2E:
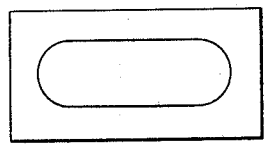

A diaphragm in accordance with the present invention can be used in a wide variety of types of electroacoustic apparatus, but FIGURE 1 shows by way of example the construction of a simple form of piezoelectric microphone with which the invention can be used with advantage. This microphone comprises a shallow dished casing 10, conveniently of aluminum or plastic material and of a suitable shape, such as circular, square or rectangular. Against the base of the casing there is mounted a piezoelectric element 11 by means of resilient mounting pads 12. A corner of the element thus mounted is connected through a driving pin 13 to the centre of a diaphragm 14; the pin can be attached, for example, by adhesive, The diaphragm 14 has an annular rim portion 15 and this rim portion is held between a turned flange 16 on the casing 10 and a perforated cover member 17, the edge of which is spun or otherwise turned over the edge of flange 16; the portion 15 of the diaphragm is thereby clamped between these two parts. The rim portion can also be secured by a suitable cement to flange 16. Connection is made to the element 11 by flexible leads 18 and terminals 20 mounted in the casing.

In a microphone of this kind the nature of the diaphragm has a very important bearing upon the operation of the microphone both as regards its sensitivity and of the frequency response. As mentioned above, the diaphragm should be as stiff as possible so that it moves substantially as a piston; should it not do so, and break up into areas that vibrate relatively, the efficiency of the microphone is impaired by reason of the frictional loss occurring in the diaphragm and also by cancellation effects that take place. On the other hand, the diaphragm should be as light as possible in order that it may accelerate rapidly, in response to vibrations, particularly those of high frequency. However, the requirements of stiffness and lightness of the diaphragm are in obvious conflict and there must always be compromise made between these two requirements.

In accordance with the present invention the diaphragm 14 is made of a material which consists wholly or substantially of aluminium and the surface of the diaphragm is locally treated by an anodising process. The effect of anodising aluminium is to convert the metal to the oxide and in this form it has a very much greater stiffness and modulus of elasticity. The anodising process adds insignificantly to the weight of the diaphragm and so it becomes possible to achieve, for the same total weight, a diaphragm which is susbtantially stiffer than could otherwise be obtained.

The stiffness of the diaphragm is desirable at that area which presents the effective working area of the diaphragm, for example the coned portion indicated in FIGURE 1, but it is not necessary, and may not be desirable, that the mounting portion of the diaphragm should be stiffened in this way. Accordingly, the anodising process is limited to certain areas only of the diaphragm and in particular it is preferred that the annular rim portion 15 should be left unanodised so as to retain an appropriate compliance for the mounting.

Much variation is possible in the way in which the anodising treatment is carried out, depending upon the particular design of diaphragm required.

In general it is possible to anodise some areas only of the surface of the metal; the anodising treatment can be carried on for a greater or lesser time so as to produce a greater or lesser thickness of the anodised layer, and the metal can be subjected to anodic treatment on one surface, or both surfaces. Combinations of these variations are also possible. If the diaphragm is thin, and is anodised on both sides it is possible to continue the anodising treatment until substantially the whole of the thickness of the aluminum is converted to the oxide form. A diaphragm so treated becomes stiff and of a glass-like nature. For most applications it is preferred to discontinue the anodising treatment before this final stage is reached, so as to leave at least some of the material of the diaphragm in its original form. The unanodised part can be on one surface of the diaphragm or can be on an interior layer between anodised surface layers of the diaphragm. This effect may be in addition to the effect obtained by any local anodising areas of the surface of the diaphragm.

The purpose of controlling the thickness of the anodising coating or coatings is to secure a desired effective elasticity or hardness of the resultant diaphragm. The modulus of elasticity of rolled, 99.3% pure aluminium is about $6.96 \times 10^{11}$ dynes/sq. cm. On the other hand, the modulus of the anodised coating is between about 34.5 and $38.7 \times 10^{11}$ dynes/sq. cm. These figures represent the limits between which the effective modulus of elasticity of the diaphragm can be varied at will by suitable treatment.

The density of the coating is about 3.7 as against 2.7 for aluminium, so that for increasing percentage anodisation the stiffness increases much faster than does the density. Consequently, at all values of the percentage anodisation there will be an improvement in the stiffness/weight ratio.

At the present time, a convenient working thickness for a metal foil used as the diaphragm of a commercially produced microphone is about .002 inch aluminium. If a foil of .001 is now used, and anodised as described the relationship between the percentage anodisation and elasticity indicates that the .001 diaphragm could be given, by anodising to about 26%, a stiffness equal to that of the thicker diaphragm, but with only 54% of its weight, corresponding to an improvement in stiffness/weight ratio of about 1.85 to 1. This is, of course, only an example of what is possible.

Examples of the many varieties of forms of diaphragms with which the invention can be used, and methods of locally anodising them, are shown in FIGURES 2, 3 and 4. Thus, the invention can be used with a diaphragm that is circular (FIGURE 2a), square (FIGURE 2b), square with a pyramidal central portion (FIGURE 2c), or rectangular, either plane (FIGURE 2d), or with a central depression (FIGURE 2e). FIGURE 3 shows various cross-sectional views of shaped diaphragms. Thus, the diaphragm can be plane (FIGURE 3a), with a central portion that is a right circular cone (FIGURE 3b), or circularly dished (FIGURE 3c). The dished or shaped central portion can be joined to the substantially plane peripheral portion by an intermediate section which lies at a substantial angle to the general plane of the diaphragm. Such a construction is shown in FIGURE 3d, where a dished central portion is joined to the outer periphery by a narrow section 22; FIGURE 3e shows a similar such section where the central part of the diaphragm is circularly coned.

Figure 4A:
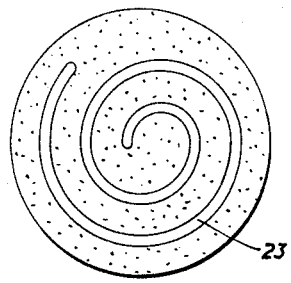
FIGURES 4a to 4g are plan views of diaphragms showing alternative ways of locally anodising the diaphragms.
Figure 4B:
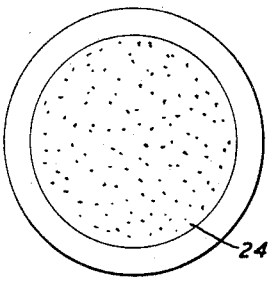
Figure 4C:
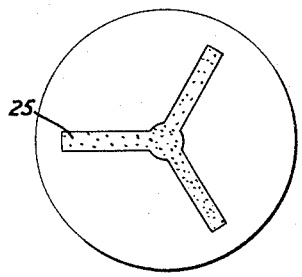
Figure 4D:
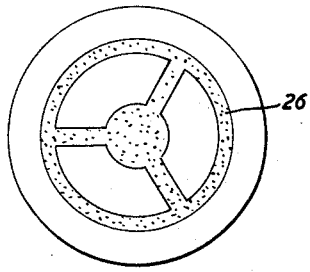
Figure 4E:
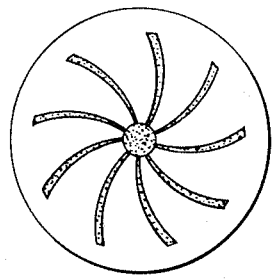
Figure 4F:
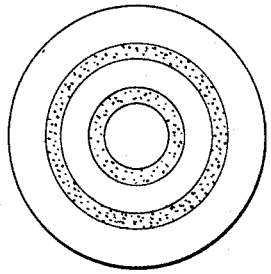
Figure 4G:
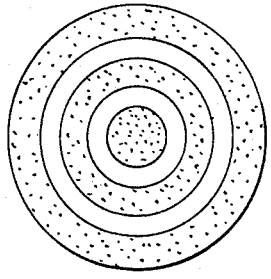

One of the problems confronting the designer of diaphragms is the break up of the diaphragm into a series of relatively vibrating parts and the present invention can be used not only to secure a diaphragm that is lighter or stiffer or both than hitherto but also to secure that the break up of the diaphragm is inhibited or restrained by local anodising of the diaphragm. FIGURE 4 shows various ways in which the anodising can be localised, though it will be appreciated that the examples given are by way of illustration only. FIGURE 4a shows a diaphragm in which a spiral area 23 of the diaphragm is left unanodised or the spiral area 23 can be anodised and the remainder unanodised; FIGURE 4b shows a diaphragm in which the central portion is completely anodised but one area, such as 24, is more heavily anodised than the other areas; FIGURE 4c shows areas with radial stiffening 25, and FIGURE 4d, a similar arrangement where the radial parts 25 are supplemented by an annular part 26; FIGURE 4e shows a radial pattern and FIGURES 4f and 4g different arrangements of annular anodised areas. In each of the cases mentioned it is not necessarily the case that the anodising is of uniform thickness over the areas indicated and it is practicable to use different thickness of anodising at different areas.

Figure 3A:
FIGURES 3a to 3e are transverse sectional views of alternative forms of diaphragms.
Figure 3B:
Figure 3C:
Figure 3D:
Figure 3E:

It is also advantageous to use a diaphragm having a cross-section such as that shown in FIGURES 3d and 3e to anodise up to the region 22. The advantage of this arrangement is that if the peripheral portion by which the diaphragm is clamped is left unanodised and the domed portion is anodised to increase its stiffness, the stiffness of the region 22 does not have an important effect on the overall stiffness of the diaphragm. This permits a greater tolerance in defining the edge of the anodised area of the diaphragm.

It will be appreciated that it becomes possible to use a thinner material than would otherwise be the case, because of the increased stiffness that is obtained with a diaphragm such as that described. However, there is another advantage in this connection that arises from the invention. The shaping, by a pressing operation, of very thin foils of metal, for example a foil such as that mentioned above as having a thickness of the order of .002 inch is not without difficulty. The metal must be sufficiently ductile to permit it to be fashioned to the required shape, whereas the metal is preferably harder so far as the requirements of the diaphragm are concerned. The metal cannot therefore be hardened before it is formed, and with very thin foils it is difficult to harden the metal by heat treatment after forming since the heat treatment tends to produce distortion. With the invention, however, it is possible to make the diaphragm of a comparatively soft grade of aluminum and then to obtain the desired hardness by the anodising process. This does not involve the treatment of the metal at any temperatures such as those as would normally be employed for heat treatment and so the distortion of the diaphragm is avoided. With the invention it has been found feasible to reduce the thickness of a diaphragm by as much as 50% whilst obtaining a diaphragm of improved stiffness. This improvement is reflected into the performance of the microphone.

The anodising process can be carried out in any suitable manner but in one method each diaphragm was first cleaned in an alkaline cleaner consisting of a solution of trisodium phosphate, about 8 to 12 ozs. per gallon of water. After a short treatment in this bath the diaphragm is washed and then treated anodically in an electrolyte consisting of a 10% solution of sulphuric acid, using a current density of about 15 amps. per sq. ft. It is desirable to keep the temperature below room temperature, for example, below 20° C., and the treatment time will vary but is conveniently about 30 minutes in a practical case. After treatment the diaphragm is washed and dried and may then be neutralised in a 5% solution of ammonium hydroxide or sodium bicarbonate. The anodised film can be improved by sealing it, for example by boiling it in hot water, acetic acid, or a mixture of nickel acetate and boric acid.

The invention thus provides a means whereby a light stiff diaphragm can be produced, and affords a convenient method of varying or controlling the stiffness of the diaphragm without recourse to expensive changes in manufacturing processes.

I claim:

1. In electroacoustical apparatus comprising an electroacoustical diaphragm connected to driving means therefor, the improvement wherein said diaphragm is constituted by thin aluminum sheet material of uniform thickness and wherein selected areas of the surface of said aluminum diaphragm are anodized to establish a corresponding surface pattern having a stiffness factor greater than that of the remaining non-anodized surface areas.

2. Electroacoustical apparatus as defined in claim 1 wherein certain of said surface areas of said diaphragm are anodized to different depths to thereby establish correspondingly different stiffened characteristics.

3. Electroacoustical apparatus as defined in claim 1 wherein said selected areas of said diaphragm are anodized throughout the complete thickness of the aluminum sheet material.

4. Electroacoustical apparatus as defined in claim 1 wherein said selected anodized areas are established on opposite faces of said diaphragm.

References Cited in the file of this patent

UNITED STATES PATENTS

| 1,832,608 | Abrahams | Nov. 17, 1931 |
| 1,918,422 | Nystrom | July 18, 1933 |
| 1,990,066 | Dutton | Feb. 5, 1935 |
| 2,531,634 | Lawrance | Nov. 28, 1950 |
| 2,663,023 | Schaaber | Jan. 12, 1954 |
| 2,869,266 | Hirdler | Jan. 20, 1959 |
| 3,075,895 | MacLean | Jan. 29, 1963 |

FOREIGN PATENTS

| 508,957 | Great Britain | July 7, 1939 |